United States Patent [19]
Pisello et al.

[11] Patent Number: 5,491,812
[45] Date of Patent: Feb. 13, 1996

[54] SYSTEM AND METHOD FOR ETHERNET TO SCSI CONVERSION

[75] Inventors: Thomas Pisello, DeBary; Guy A. Carbonneau, Winter Springs, both of Fla.

[73] Assignee: Conner Peripherals, Inc., San Jose, Calif.

[21] Appl. No.: 951,601

[22] Filed: Sep. 28, 1992

[51] Int. Cl.$^6$ ............................................. G06F 13/00
[52] U.S. Cl. ..................... 395/500; 395/200.2; 395/825; 395/872; 364/239; 364/238.3; 364/DIG. 1
[58] Field of Search .................................. 395/200, 275; 371/40.1

[56] References Cited

U.S. PATENT DOCUMENTS

| | | | |
|---|---|---|---|
| 5,067,071 | 11/1991 | Schanim et al. | 395/275 |
| 5,146,461 | 9/1922 | Duschatko et al. | 371/40.1 |
| 5,191,653 | 3/1993 | Banks et al. | 395/275 |
| 5,222,216 | 6/1993 | Parish et al. | 395/275 |
| 5,287,455 | 2/1994 | Rosenth | 395/200 |
| 5,321,816 | 6/1994 | Rogan et al. | 395/200 |
| 5,355,421 | 10/1994 | Koyama | 382/54 |
| 5,355,453 | 10/1994 | Row et al. | 395/200 |
| 5,404,548 | 4/1995 | Nishioka | 395/800 |

*Primary Examiner*—Christopher B. Shin
*Attorney, Agent, or Firm*—Fliesler, Dubb, Meyer & Lovejoy

[57] ABSTRACT

A method and apparatus for interfacing a SCSI device directly to an Ethernet network utilizes a single board converter for translating information packets in Ethernet format to a SCSI format. In reverse, the same converter translates information from a SCSI device into a format suitable for transmission on an Ethernet bus. The method defines a procedure for receiving, recognizing and translating data bi-directionally between the bus and the SCSI device.

6 Claims, 5 Drawing Sheets

SYSTEM AND METHOD FOR ETHERNET TO SCSI CONVERSION

BACKGROUND OF THE INVENTION

The present invention relates to local area networks (LAN) such as used for interfacing computers and peripheral equipment and, more particularly, to a method and apparatus for providing a data path between remote equipment via an Ethernet network wherein the remote equipment utilizes a small computer system interface (SCSI) protocol.

FIG. 1 is a simplified block diagram of a conventional local area network (LAN) in which a plurality of LAN servers 10 interface a plurality of SCSI devices 12 to the network. The SCSI devices 12 may comprise computers and remote storage devices, e.g., tape drives. One or more printers 14 may be coupled directly to the physical network represented by lines 16. The LAN servers 10 translate or configure data generated by the SCSI devices 12 into a protocol suitable for transmission on the network. The servers 10 also receive transmitted data and convert such data into a form suitable for use by the SCSI devices 12. The printer 14 typically includes its own converter for receiving data in the Ethernet protocol and converting it to a serial or parallel form for driving the printer. With the exception of the printer driver interface, the remaining devices 12 on the network all require a LAN server interface for connection to the network. Accordingly, it would be desirable to provide a method and apparatus to enable communication between SCSI devices without use of a separate LAN server.

SUMMARY OF THE INVENTION

The present invention is illustrated in a data communication system for providing data storage and retrieval between at least one computer and at least one remote storage device.

A communication network interconnects the computer and the remote storage device and includes means for transferring data and commands using an Ethernet protocol. The computer and the remote storage device utilize a data and command processing protocol in accordance with the small computer systems interface (SCSI).

Communication converters are coupled to each of the computer and the remote storage device for converting data and commands between the Ethernet protocol used on the network and the SCSI protocol used in the computer and remote storage device. Each of the communication converters comprises a network interface controller for receiving data and commands from the network and transmitting data and commands onto the network.

A flow control processor is coupled to the network interface controller for interpreting commands received from the network and accumulating data received by the network interface controller and formatting commands and data for transmission by the network interface controller.

An SCSI controller is operatively coupled to the flow control processor and linked to the remote storage device. The SCSI controller forwards commands from the flow control processor to the remote storage device and transfers data accumulated in the flow control processor to the remote storage device in a receive mode and transfers data to the flow control processor in a transmit mode.

In one form, the network interface controller is implemented within an Ethernet logic circuit which comprises a transceiver interface having at least first and second I/O terminals with the first I/O terminal being coupled to the network.

A pulse transformer and a serial network interface are coupled in series circuit between the second I/O terminal and the network interface controller. Finally, a memory for storage of commands and data processed by the network interface controller is coupled to the controller.

In further accordance with the invention there is also provided a method for interfacing at least one SCSI device to an Ethernet LAN using an Ethernet/SCSI interface card. The method comprises the steps of determining, at the interface card, if data packets are to be received or transmitted between the LAN and SCSI device; translating each received data packet; determining, from the step of translating, if the data packet is a SCSI packet; processing each non-SCSI packet as an internal command and returning to a ready state for receiving and transmitting data packets; determining, for each SCSI packet, whether the packet comprises data or commands; processing each SCSI command and returning to the ready state; transferring each packet of SCSI data to a storage queue; and moving each data packet in the order received to the at least one SCSI device.

The inventive method may include the further steps of determining if a SCSI packet comprises a status request; obtaining, for each status request, the status of the SCSI device; sending the status of the device as an Ethernet packet on the Ethernet network; receiving, for each data packet to be transmitted on the Ethernet network, data from the SCSI device; adding the SCSI device data to an Ethernet queue; and transmitting, upon determination of a network ready status, the device data onto the Ethernet network. The method also includes formatting the SCSI data into packets corresponding to an Ethernet protocol prior to the step of transmitting.

BRIEF DESCRIPTION OF THE DRAWINGS

For a better understanding of the present invention, reference may be had to the following detailed description taken in conjunction with the accompanying drawings in which.

DETAILED DESCRIPTION

Figure 1:
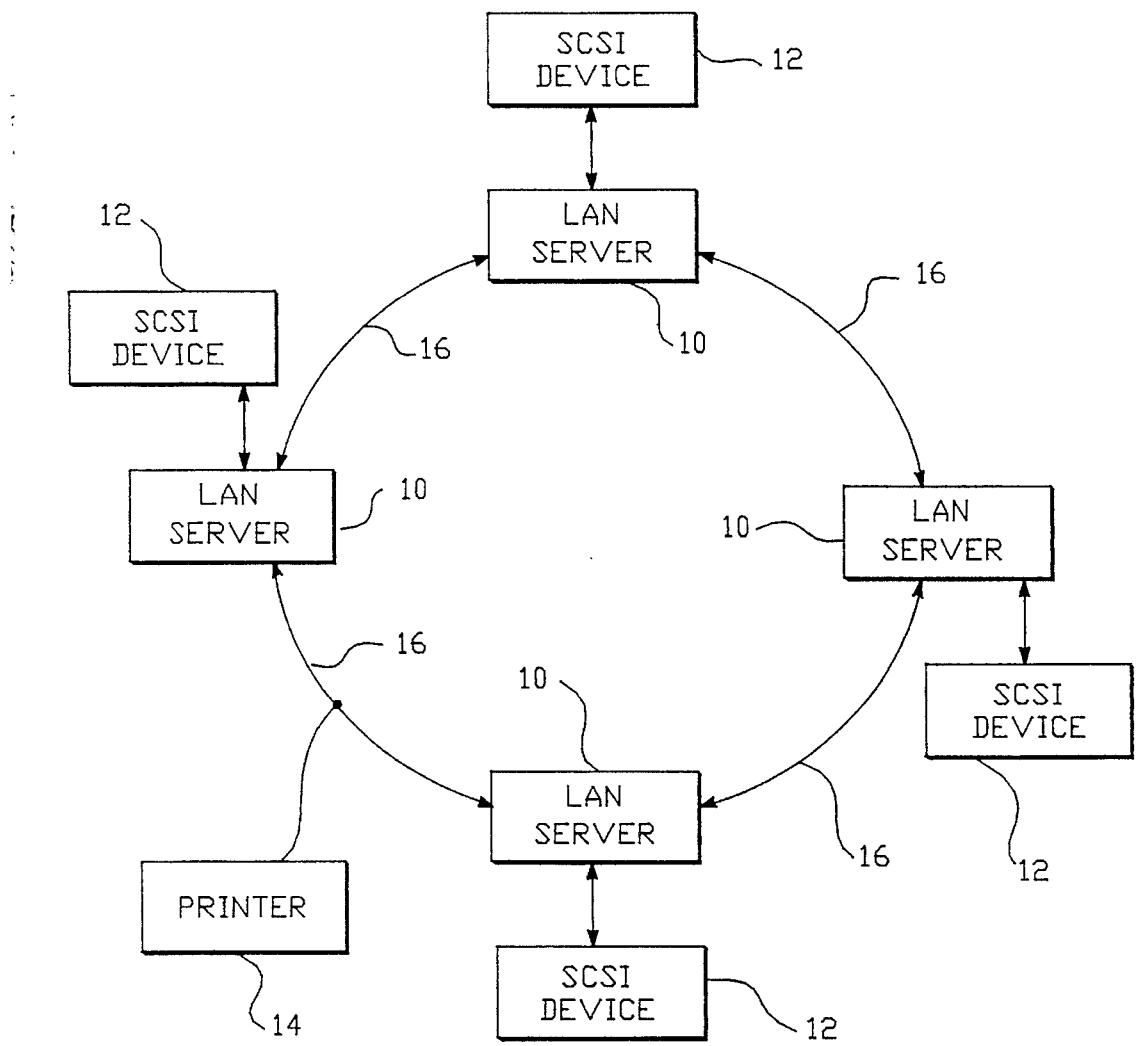
FIG. 1 is a simplified block diagram of a conventional LAN.
Figure 2:
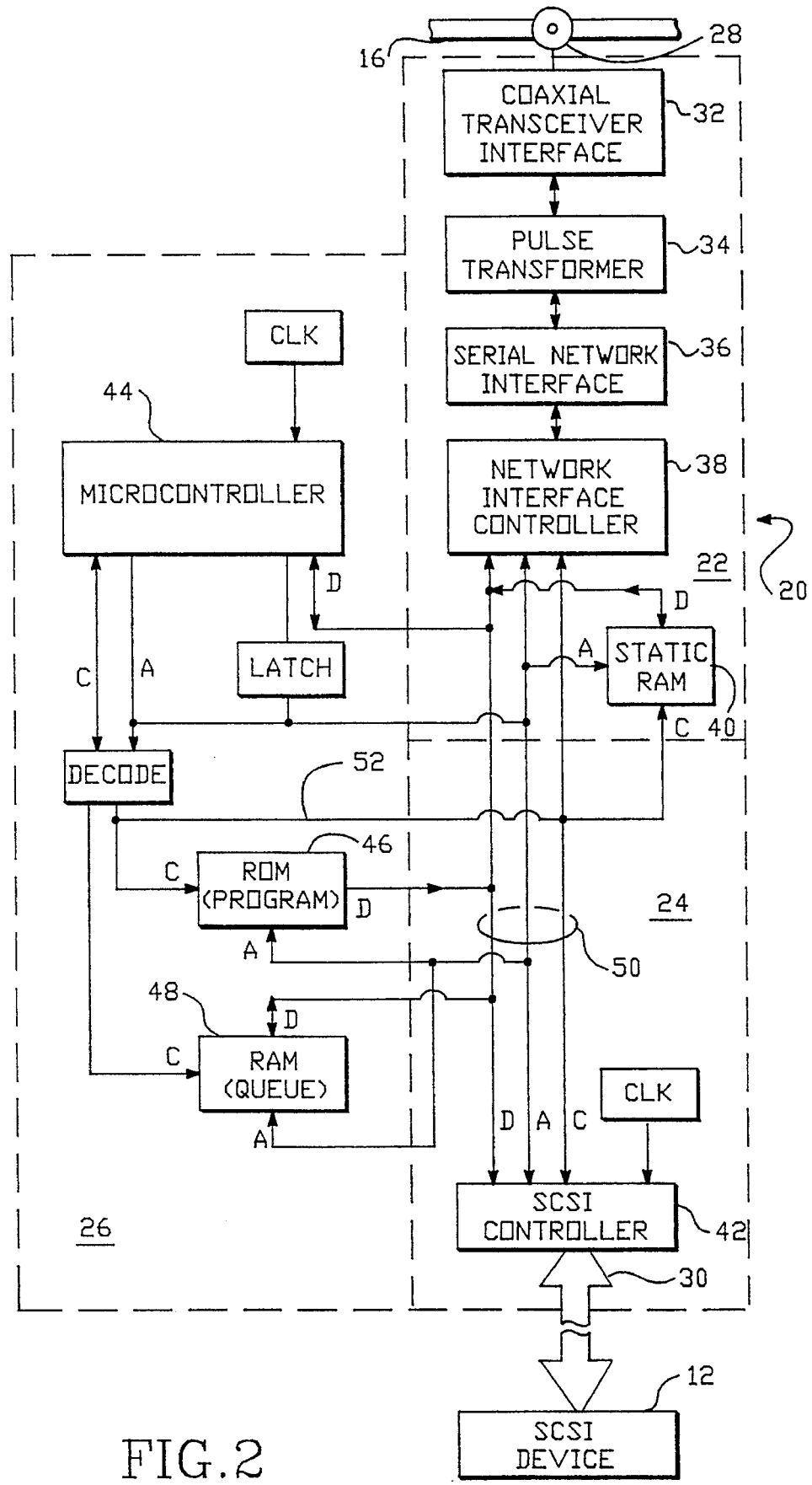
FIG. 2 is a functional block diagram of a network interface card in accordance with the present invention.

FIG. 2 is a simplified block diagram of an interface card 20 which can be installed in each of the SCSI devices 12 of FIG.1 to enable their connection directly to network 16 thus eliminating the need for LAN servers 10. The card 20 includes an Ethernet logic circuit 22, a SCSI logic circuit 24 and a flow control processor circuit 26 for controlling information flow between circuits 22 and 24. The Ethernet logic circuit 22 is connected via a conventional coupler 28 (BNC type) to network lines 16. The SCSI logic circuit 24 is connected to a SCSI bus 30, typically via a conventional card edge connection.

Ethernet logic circuit 22 includes a coaxial transceiver interface 32 (National Semiconductor, Inc. —type DP8392) having at least a first and a second input/output (I/O) terminal, said first terminal being adapted for coupling to line 16, said second terminal being coupled to a pulse transformer 34 (Toko, Ltd. —type PE-64103) for signal isolation. A serial network interface 36 (National Semiconductor, Inc. —type DP8391) is coupled in circuit between transformer 34 and a network interface controller 38. A static random access memory (RAM) 40 is operatively coupled to controller 38. Interface controller 38 may comprise type DP8390B integrated circuit (IC) chip from National Semiconductor. In a receive mode circuit 22 recognizes addresses forming part of header information associated with a message block and grabs that message block from the network. Circuit 22 strips the address and other header information from the message block and stores the data in RAM 40. Circuit 22 then signals flow control processor circuit 26 that data is waiting in RAM 40.

SCSI logic circuit 24 comprises a conventional SCSI controller 42 such as a type WD33C93A distributed by Western Digital Corp. Controller 42 has address, data and control terminals connected to corresponding terminals of controller 38 in Ethernet logic circuit 22. Controller 42 is also coupled to SCSI bus 30 for transferring information between devices on the SCSI bus and the controller 42.

Processor circuit 26 comprises a conventional microprocessor 44 coupled in circuit with a read only memory (ROM) 46 and a RAM 48. Processor 44 includes address, control and data lines coupled to corresponding ones of the lines 50 interconnecting controllers 38 and 42. When processor 44 recognizes data in RAM 40, it accesses RAM 40 via control line 52 and downloads data into RAM 48. The data in RAM 48 is then moved on a FIFO basis through controller 42 onto bus 30. The processor 44 extracts SCSI commands and data from Ethernet packet information and translates the commands and data into a form acceptable by the controller 42. Similarly, processor 42 translates SCSI commands and data into a form (protocol) acceptable to controller 38.

Information transfer from bus 30 onto Ethernet network 16 follows a reverse flow pattern. The processor 38 appends header information to each data block conforming to the Ethernet protocol.

Figure 3:
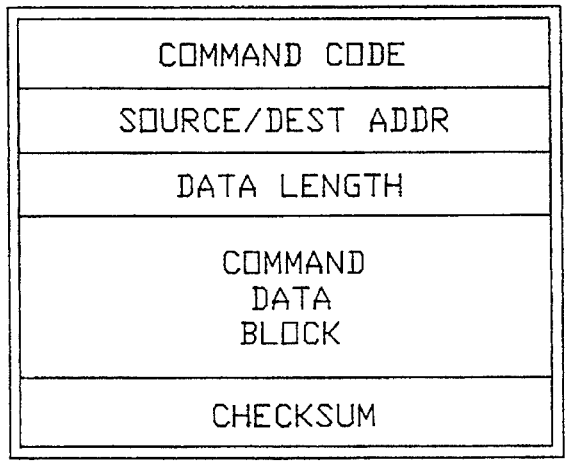
FIGS. 3–5 are illustrations of message block formats for use in accordance with the invention.
Figure 4:
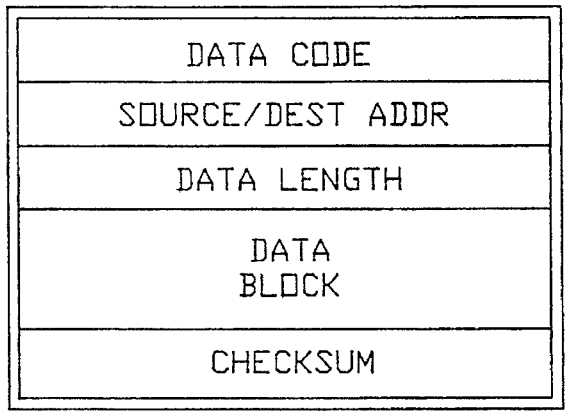
Figure 5:
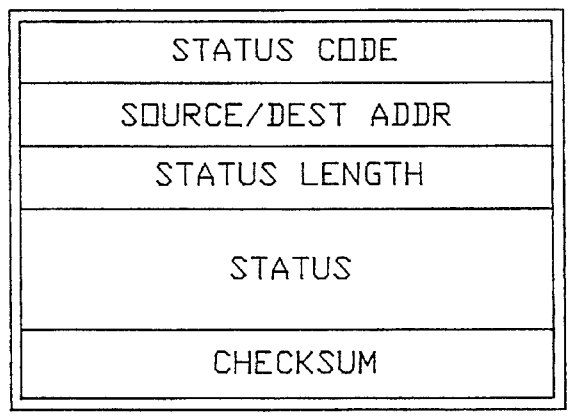

FIGS. 3, 4 and 5 illustrate the coding of information received and transmitted over the Ethernet network. FIG. 3 shows a format for a command wherein the COMMAND CODE may be a one byte character indicating command data follows; SOURCE/DEST ADDR may be a field indicating the source and destination device for the command data; DATA LENGTH is a field indicating the length of data contained in the COMMAND DATA BLOCK, which BLOCK contains the command instructions to be processed; and CHECKSUM is a field containing a checksum of the COMMAND DATA BLOCK used to validate information transfer.

FIG. 4 shows a format for a data packet wherein DATA CODE is a field indicating data is in the packet; SOURCE/DEST ADDR is a field indicating the source and destination for the information packet; DATA LENGTH is a field indicating the length of data contained in a DATA BLOCK, which BLOCK contains the data to be managed; and CHECKSUM is a checksum of the DATA BLOCK.

FIG. 5 shows a format for a status information packet. The STATUS CODE is a field indicating that a status information packet follows. The remaining fields are substantially the same as described for COMMAND and DATA packets except that the fields relate to the status request in the STATUS block.

Figures 6, 8:
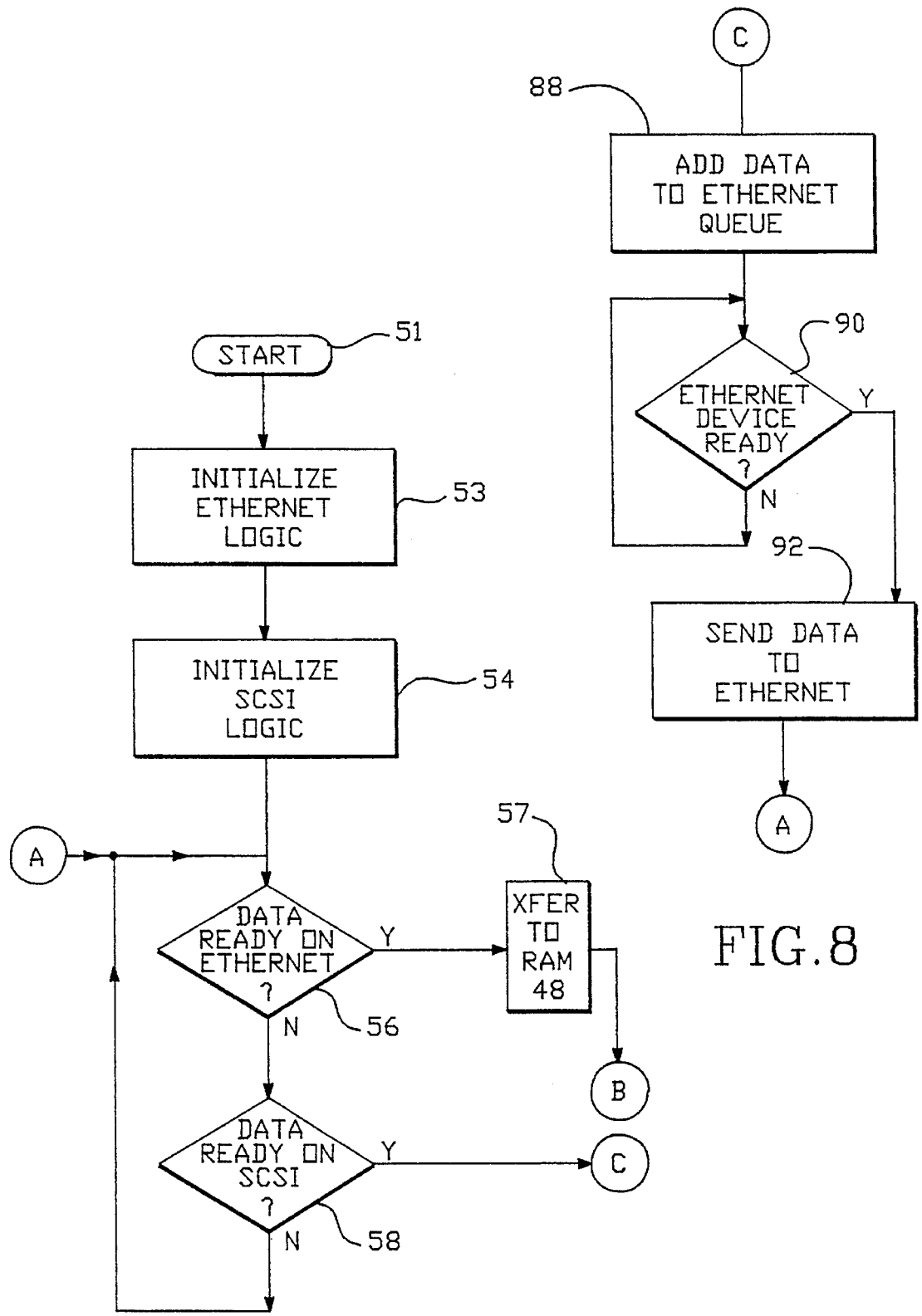
FIGS. 6–8 are flow diagrams for an application program for use in accordance with the invention.

As previously described, the flow control processor 24 provides the interface between the controller 38 and controller 42. The processor 44 also initializes both the Ethernet logic circuit 22 and the SCSI logic circuit 26. In order to more fully explain the operation of the system of FIG. 2, reference is now made to FIGS. 6, 7 and 8 which are functional flow diagrams for the processing of information through the inventive Ethernet to SCSI converter. Turning first to FIG. 6, an applications program residing in ROM 46 implements the flow control processor protocol when power is applied to the system as indicated by start block 50. As shown in block 53, the program first initializes the Ethernet logic circuit 22 and then initializes the SCSI logic circuit 24, block 54. After initializing both the Ethernet logic and SCSI logic circuits, the process controller then checks to determine if the Ethernet logic circuit has data waiting in RAM memory 40, block 56. If data is available in RAM 40, the program transfers 57 the data to RAM 48 and branches to point B in FIG. 7. If no data is available in RAM 40, the program steps to block 58 to determine whether the SCSI interface controller has data available for transferring from the SCSI logic circuit 24 to the Ethernet logic circuit 22. If the SCSI controller does not have data available for transfer, the program loops to again check for data from the Ethernet controller at block 56. If data is available from the SCSI controller, the program steps to point C in FIG. 8.

Figure 7:
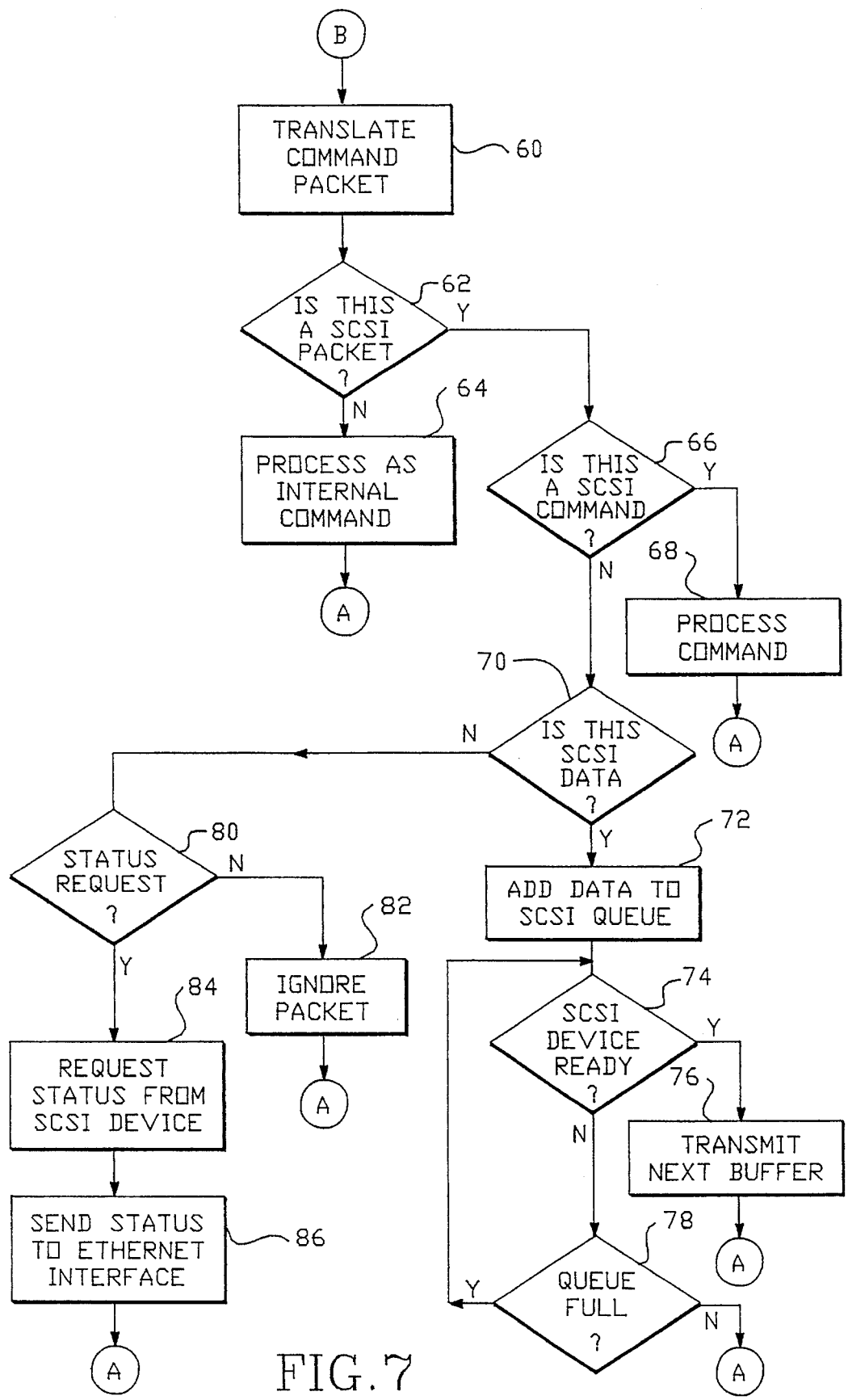

Turning now to FIG. 7, it will be recalled that the point B was entered from the Ethernet data available decision block 56 indicating that data was available to be transferred to the SCSI bus 30. The first step for the flow control processor 26 is to translate the command packet, block 60, it being recognized that the first message or information received on the Ethernet network is a command packet describing what action to take with data or message information to follow. After translating, the control processor then determines if the packet is a SCSI packet. If it is not a SCSI packet, the processor treats the command as an internal command, block 64, and then exits back to point A in FIG. 6 to the ready state moving through blocks 56 and 58. Returning to block 62, if the processor determines that the packet is a SCSI packet, it next proceeds to block 66 to determine whether or not the packet is a command. If the packet is a command, the program steps to block 68 and executes the command thereafter returning .to point A in FIG. 6. If the packet is not a command, the processor next determines whether the packet contains data, block 70. If the control processor determines that the information packet contains data, it steps to block 72 and adds the data to the SCSI queue, i.e. that is to data in the RAM 48. If the SCSI device connected to the bus 30 is ready to accept the data, block 74, the program transfers the data to the SCSI interface controller 42, block 76. The program thereafter returns to point A in FIG. 6 waiting further data information to be transferred into RAM 40. Returning again to block 74, if the program determines that the SCSI device is not ready to accept data, it then checks to determine if the queue, i.e., RAM 48 is full, and if so, then merely loops back to wait for the SCSI device to be ready to accept data. If the queue is not full, the program moves back to point A to determine if additional data is resident in RAM 40.

Again considering block 70, if the program determines that the information contained in the data packet is not SCSI data, the program steps to block 80 to determine if the message comprises a status request. If the information packet does not comprise a status request, the program recognizes that it is neither a command, data or status and therefore simply ignores the packet, block 82, returning to point A to look for additional information in RAM 40. If it is determined that the packet is a status request, the program steps to block 84 and requests status from the appropriate SCSI device on bus 30. The status information is then transferred to the Ethernet interface, block 86. Thereafter, the program again returns to point A in FIG. 6 looking for additional data in RAM 40.

Turning now to FIG. 8, it will be recalled that the program step 58 in FIG. 6 determined whether the SCSI device had data ready to be sent out on to the Ethernet network. In the case where data is to be sent from the SCSI device to the Ethernet network, the program steps to block 88 and adds the data to the Ethernet queue. It then checks to determine if the Ethernet device is ready for data and if so sends the data out on Ethernet. If the Ethernet device is not ready for data, the program simply loops around the block 90 until the device is ready to accept data. Once the data has been sent to Ethernet, the program loops back to point A in FIG. 6 again seeking data in either the Ethernet or SCSI queues. In order to further exemplify the above described process flow and data handling occurring through the flow control processor, the following is an example of the logic flow which would occur when a SCSI write command is received via the Ethernet interface or Ethernet logic circuit 22. Initially the Ethernet to SCSI converter or interface card 20 is programmed to respond to a specific node on the Ethernet network 16. All packets of information containing this predetermined node address will be recognized by the interface card 20. The SCSI interface controller 42 is initialized with specific preselected values and sits in an idle state awaiting specific instructions from the flow control processor circuit 26 to talk to external SCSI devices on the bus 30. The control processor 26, after initializing both the Ethernet logic circuit 22 and the SCSI logic circuit 24, resides in a housekeeping loop awaiting commands from a host on the Ethernet network 16. When the Ethernet logic circuit 22 receives an Ethernet packet that is addressed to the interface card 20, the controller 38 requests service from the processor circuit 26 by generating an interrupt to the microprocessor 44. The flow control processor circuit 26 recognizes the interrupt and initiates a transfer of the received packet from the Ethernet logic circuit 22 buffer area (static RAM 40) to the processor circuit 26 buffer area (RAM 48). Once the information packet has been transferred to RAM 48, the Ethernet logic circuit 22 returns to looking for more Ethernet packets addressed to interface card 20. The flow control processor circuit 26 is then free to operate on the received packet now stored in RAM 48 and determine what action needs to be taken with it. In the exemplary case of a received write command, the processor circuit 26 reads the stored packet in the RAM 48 and identifies the command block. As previously described, the first byte of the command block defines the type of command that the processor circuit 26 will process. In this case, the command is a SCSI write command and the following bytes after the first byte contains the address of the SCSI device into which data is to be written. The format of the command block is described above with regard to FIG. 3. The processor circuit 26 reads the remainder of the information from the command block which contains the command descriptor block and programs the SCSI controller 42 with the information from the command descriptor block. At this point the SCSI controller 42 is ready to start the write sequence. However, the control processor 24 must wait for the data from the Ethernet interface before the command can actually continue.

Accordingly, the control processor circuit 26 returns to its housekeeping loop and awaits a request for service, i.e., an interrupt, from the Ethernet logic circuit 22. When the logic circuit 22 receives an Ethernet packet addressed to interface card 20, the circuit 22 requests service from the processor circuit 26 by generating another interrupt to the processor circuit. The processor circuit 22 exits its housekeeping loop and transfers the incoming message packet from RAM 40 to the RAM 48. This process of receiving information packets, interrupting the control processor circuit 26 and transferring the packets into the RAM 48 continues until the SCSI output buffer, i.e., a section of RAM in the control processor 26 buffer area or RAM48, is filled. When the SCSI output buffer portion of RAM 48 is filled, the processor circuit 26 instructs the SCSI controller 42 to start the write sequence.

The write sequence started by the SCSI controller 42 includes selecting a desired SCSI device using the SCSI protocol and transferring the data contained in the SCSI output buffer of RAM 48 to the desired SCSI device via SCSI bus 30. While this transfer is being handled by the SCSI controller 42, the flow control processor circuit 26 returns to its housekeeping loop and awaits service request from either the Ethernet logic circuit 22 or the SCSI controller 24. Once the SCSI controller has finished the write sequence and transferred all of the data in the SCSI buffer portion of RAM 48 to the appropriate SCSI device, the SCSI controller 24 requests service from the flow control processor. The flow control processor 26 responds to the SCSI interrupt or service request and determines that the SCSI controller 42 (more specifically, the SCSI controller status registers) that the write command has been finished successfully. Note that while the flow control processor circuit 26 is in the housekeeping loop and the SCSI controller 42 is writing to the SCSI device, service may be requested from either the Ethernet logic circuit 22 or the SCSI controller 24. If service is requested from the Ethernet logic circuit 22 indicating that additional packets have been received, the control processor circuit 24 will buffer the data from the circuit 22 until the previous command (the write command) is finished. Once the write command has been completed and the SCSI controller has requested service, the control processor circuit 26 creates a status packet containing the SCSI status information regarding the prior received write command along with the address of the Ethernet device that had previously sent the write command and places the status packet in the Ethernet logic circuit 22 output buffer. The output buffer may be a section of the RAM 40 controlled by the controller 38°. The processor circuit 26 then instructs the controller 38 to send the status packet. At that point, all Ethernet protocol is handled by the Ethernet logic circuit 22 and the flow control processor circuit 26 returns back to its housekeeping loop.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A data communication system for providing data storage and retrieval between at least one computer and at least one remote storage device, each of the computer and the remote storage device being a SCSI device utilizing a data and command exchange protocol in accordance with the small computer systems interface protocol (SCSI), said system comprising:

an Ethernet network interconnecting the at least one computer and the at least one remote storage device, the Ethernet network including packet transfer means for transferring packets containing data and commands using an Ethernet protocol;

a plurality of communication converters each coupling a respective one of the at least one computer and the at least one remote storage device to the Ethernet network for passing data and commands through the Ethernet network between the at least one computer and the at least one remote storage device, each of said communication converters comprising:

a network interface controller for receiving Ethernet packets containing data and commands from the Ethernet network and transmitting Ethernet packets containing data and commands onto the Ethernet network;

a flow control processor coupled to the network interface controller for interpreting command packets received from the Ethernet network and for accumulating data received by the network interface controller from the Ethernet network and for formatting commands and data for transmission onto the Ethernet network by the network interface controller; and an SCSI controller coupled to the flow control processor and linked to the respective SCSI device, said SCSI controller transferring SCSI commands from the flow control processor to the respective SCSI device and transferring SCSI data accumulated in the flow control processor to the respective SCSI device in a receive mode and transferring SCSI data to the flow control processor in a transmit mode.

2. The system of claim 1 wherein said network interface controller is implemented within an Ethernet logic circuit comprising:

a transceiver interface having at least first and second I/O terminals, said first I/O terminal being coupled to said Ethernet network;

a pulse transformer and a serial network interface coupled in series between said second I/O terminal and said network interface controller; and memory means for storage of commands and data processed by said network interface controller.

3. A method for interfacing at least one SCSI device to an Ethernet LAN, the method comprising the steps of:

(a) providing an Ethernet/SCSI interface card coupled to the SCSI device and to the Ethernet LAN;

(b) determining, at the interface card, if a communications packet has been received from either of the Ethernet LAN and SCSI device, and if not repeating this step (b) until a packet is received;

(c) in the case where a communications packet has been received from the Ethernet LAN, translating the received Ethernet packet;

(d) determining, from the step of translating, if the Ethernet packet is a SCSI-related packet or a SCSI-unrelated packet;

(e) processing each SCSI-unrelated packet as an internal command and thereafter returning to a ready state defined by said step (b) of waiting for receipt of a communications packet from either the Ethernet LAN or the SCSI device;

(f) determining, for each SCSI-related packet, whether the packet contains SCSI data or a SCSI command;

(g) in response to a determination that the SCSI-related packet contains a SCSI command, processing the SCSI command and thereafter returning to the ready state:

(h) in response to a determination that the SCSI-related packet contains SCSI data, transferring the packet of SCSI data to a storage queue; and (i) when the SCSI device is ready to receive, moving queued SCSI data according to the order received to the at least one SCSI device.

4. The method of claim 3 and including the further steps of:

(j) determining if a SCSI-related packet received from the Ethernet LAN contains a status request;

(k) obtaining, for each status request, the status of the corresponding SCSI device; and (l) sending the obtained status of the SCSI device to the Ethernet LAN as part of an Ethernet packet.

5. The method of claim 3 and including the further steps of:

(j) in the Case where a communications packet has been received from the SCSI device, adding data of the received communications packet to an Ethernet queue; and (k) transmitting, upon determination of a Ethernet ready status, the queued Ethernet data onto the Ethernet LAN.

6. The method of claim 5 and further including the step of formatting the data received from the SCSI device into packets corresponding to an Ethernet protocol prior to the step of transmitting said data onto the Ethernet LAN.

* * * * *